(12) United States Patent
Wu et al.

(10) Patent No.: US 11,347,575 B2
(45) Date of Patent: May 31, 2022

(54) SERVICE ADVISORY SYSTEM AND METHOD

(71) Applicant: EMC IP Holding Company, LLC, Hopkinton, MA (US)

(72) Inventors: Minqiang Wu, Shanghai (CN); Jun Wu, Shanghai (CN); Butong Zhang, Shanghai (CN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 179 days.

(21) Appl. No.: 16/038,428

(22) Filed: Jul. 18, 2018

(65) Prior Publication Data
US 2019/0026172 A1    Jan. 24, 2019

(30) Foreign Application Priority Data
Jul. 21, 2017    (CN) .......................... 201710599913.3

(51) Int. Cl.
| | |
|---|---|
| *G06F 11/00* | (2006.01) |
| *G06F 11/07* | (2006.01) |
| *H04L 67/10* | (2022.01) |
| *H04L 67/1097* | (2022.01) |

(52) U.S. Cl.
CPC ........ *G06F 11/079* (2013.01); *G06F 11/0727* (2013.01); *G06F 11/0751* (2013.01); *G06F 11/0775* (2013.01); *G06F 11/0787* (2013.01); *G06F 11/0793* (2013.01); *H04L 67/10* (2013.01); *H04L 67/1097* (2013.01)

(58) Field of Classification Search
CPC .............................. G06F 11/327; G06F 11/324
See application file for complete search history.

(56) References Cited

U.S. PATENT DOCUMENTS

| | | | | | |
|---|---|---|---|---|---|
| 6,138,253 | A * | 10/2000 | Buzsaki | ............. | G06F 11/0709 714/47.1 |
| 6,438,716 | B1 * | 8/2002 | Snover | ................ | G06F 11/327 714/48 |
| 6,526,529 | B1 * | 2/2003 | Miksovsky | ........... | G06F 11/327 714/57 |
| 7,702,782 | B1 * | 4/2010 | Pai | ....................... | G06F 11/327 709/224 |
| 9,183,072 | B1 * | 11/2015 | Makuch | .............. | G06F 11/0748 |
| 9,223,672 | B1 * | 12/2015 | Honton | ................. | G06F 11/327 |

(Continued)

FOREIGN PATENT DOCUMENTS

CN        109285091 A    1/2019

OTHER PUBLICATIONS

Google Scholar/Patents—text refined (Year: 2020).*
Google Scholar/Patents—text refined (Year: 2021).*

*Primary Examiner* — Christopher S McCarthy
(74) *Attorney, Agent, or Firm* — Brian J. Colandreo; Mark H. Whittenberger; Holland & Knight LLP

(57) ABSTRACT

A method, computer program product, and computing system for receiving a message library update, wherein the message library update includes a plurality of error codes associated with a plurality of error/advisory messages. A specific error code concerning a storage system is compared to the plurality of error codes included within the message library update to identify a specific error/advisory message associated with the specific error code. The specific error/advisory message is provided to a user of the storage system.

26 Claims, 5 Drawing Sheets

(56) References Cited

U.S. PATENT DOCUMENTS

| | | | | |
|---|---|---|---|---|
| 2002/0184589 A1* | 12/2002 | Eatough | ............. | G06F 11/0709 |
| | | | | 714/746 |
| 2003/0101385 A1* | 5/2003 | Lee | ................... | G06F 11/0709 |
| | | | | 714/48 |
| 2009/0112860 A1* | 4/2009 | Yuasa | ................... | G06F 11/079 |
| 2012/0331350 A1* | 12/2012 | Dhoolia | ............... | G06F 11/366 |
| | | | | 714/38.1 |
| 2017/0315898 A1* | 11/2017 | Abdul | ................... | G06F 11/366 |
| 2018/0091357 A1* | 3/2018 | Hibino | ................... | H04L 41/06 |

* cited by examiner

SERVICE ADVISORY SYSTEM AND METHOD

RELATED APPLICATION

The subject application claims the priority of China Patent Application No. 201710599913.3, filed on 21 Jul. 2017, the contents of which are herein incorporated by reference in its entirety.

TECHNICAL FIELD

This disclosure relates to service advisory systems and methods and, more particularly, to service advisory systems and methods for use within data storage systems.

BACKGROUND

Storing and safeguarding electronic content is of paramount importance in modern business. Accordingly, various methodologies may be employed to protect such electronic content. One such methodology is to utilize high availability systems to reduce the likelihood of data loss. As would be expected, such high availability systems are often quite complex.

Unfortunately, when problems occur with these high availability systems and error messages are subsequently generated, these error messages often lack specifics, thus requiring the user to contact technical support (which requires user time and technical support time).

SUMMARY OF DISCLOSURE

In one implementation, a computer-implemented method is executed on a computing device and includes receiving a message library update, wherein the message library update includes a plurality of error codes associated with a plurality of error/advisory messages. A specific error code concerning a storage system is compared to the plurality of error codes included within the message library update to identify a specific error/advisory message associated with the specific error code. The specific error/advisory message is provided to a user of the storage system.

One or more of the following features may be included. Receiving a message library update may include periodically receiving message library updates independent of other updates concerning the storage system. Receiving a message library update may include receiving the message library update on a storage system. Comparing a specific error code concerning a storage system to the plurality of error codes included within the message library update may include comparing the specific error code concerning the storage system to the plurality of error codes included within the message library update that was received on the storage system. Receiving a message library update may include receiving the message library update on a remote platform. Comparing a specific error code concerning a storage system to the plurality of error codes included within the message library update may include providing the specific error code to the remote platform and comparing the specific error code concerning the storage system to the plurality of error codes included within the message library update that was received on the remote platform. Providing the specific error/advisory message to a user of the storage system may include providing the specific error/advisory message to a user of the storage system via the remote platform.

In another implementation, a computer program product resides on a computer readable medium and has a plurality of instructions stored on it. When executed by a processor, the instructions cause the processor to perform operations including receiving a message library update, wherein the message library update includes a plurality of error codes associated with a plurality of error/advisory messages. A specific error code concerning a storage system is compared to the plurality of error codes included within the message library update to identify a specific error/advisory message associated with the specific error code. The specific error/advisory message is provided to a user of the storage system.

One or more of the following features may be included. Receiving a message library update may include periodically receiving message library updates independent of other updates concerning the storage system. Receiving a message library update may include receiving the message library update on a storage system. Comparing a specific error code concerning a storage system to the plurality of error codes included within the message library update may include comparing the specific error code concerning the storage system to the plurality of error codes included within the message library update that was received on the storage system. Receiving a message library update may include receiving the message library update on a remote platform. Comparing a specific error code concerning a storage system to the plurality of error codes included within the message library update may include providing the specific error code to the remote platform and comparing the specific error code concerning the storage system to the plurality of error codes included within the message library update that was received on the remote platform. Providing the specific error/advisory message to a user of the storage system may include providing the specific error/advisory message to a user of the storage system via the remote platform.

In another implementation, a computing system includes a processor and memory is configured to perform operations including receiving a message library update, wherein the message library update includes a plurality of error codes associated with a plurality of error/advisory messages. A specific error code concerning a storage system is compared to the plurality of error codes included within the message library update to identify a specific error/advisory message associated with the specific error code. The specific error/advisory message is provided to a user of the storage system.

One or more of the following features may be included. Receiving a message library update may include periodically receiving message library updates independent of other updates concerning the storage system. Receiving a message library update may include receiving the message library update on a storage system. Comparing a specific error code concerning a storage system to the plurality of error codes included within the message library update may include comparing the specific error code concerning the storage system to the plurality of error codes included within the message library update that was received on the storage system. Receiving a message library update may include receiving the message library update on a remote platform. Comparing a specific error code concerning a storage system to the plurality of error codes included within the message library update may include providing the specific error code to the remote platform and comparing the specific error code concerning the storage system to the plurality of error codes included within the message library update that was received on the remote platform. Providing the specific error/advisory message to a user of the storage system may include providing the specific error/advisory message to a user of the storage system via the remote platform.

The details of one or more implementations are set forth in the accompanying drawings and the description below. Other features and advantages will become apparent from the description, the drawings, and the claims.

BRIEF DESCRIPTION OF THE DRAWINGS

FIG. 4A is a diagrammatic view of a message library update.

Like reference symbols in the various drawings indicate like elements.

DETAILED DESCRIPTION OF THE PREFERRED EMBODIMENTS

System Overview

Figure 1:
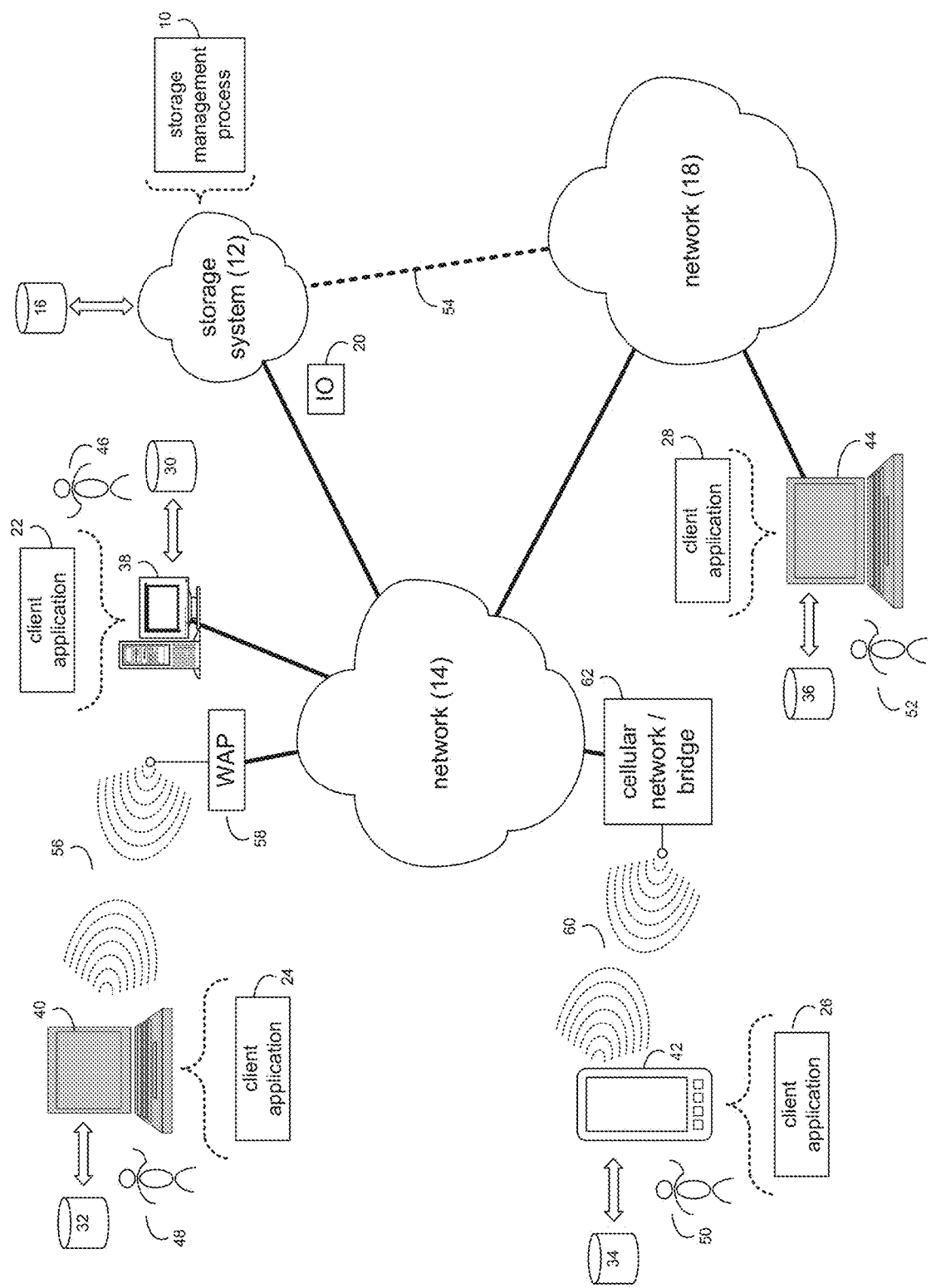
FIG. 1 is a diagrammatic view of a storage system and a storage management process coupled to a distributed computing network.

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh", Redhat Linux", or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
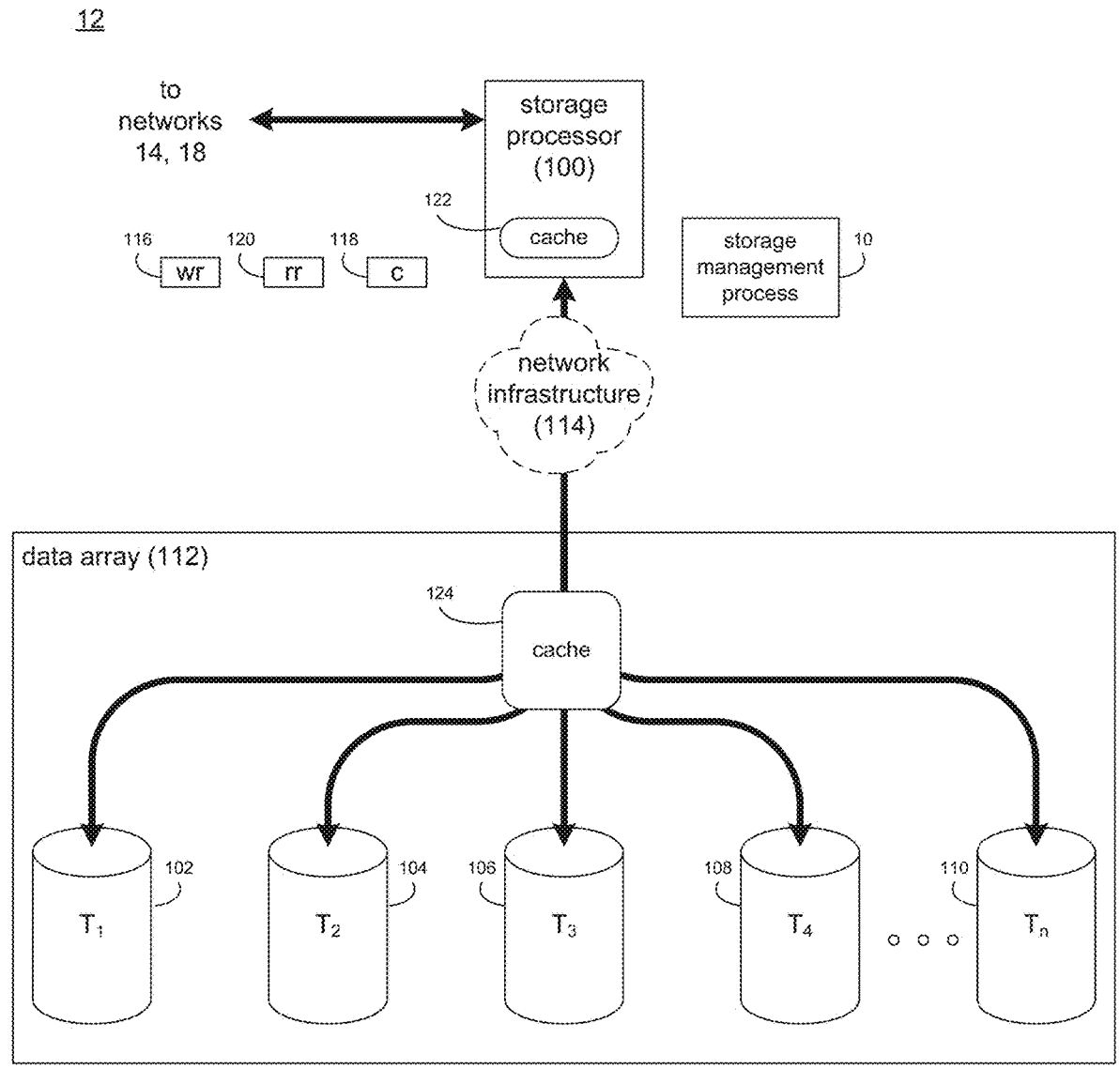
FIG. 2 is a diagrammatic view of another implementation of the storage system of FIG. 1.

Referring also to FIG. 2, there is shown one particular implementation of storage system 12. Storage system 12 may include storage processor 100 and a plurality of storage targets Ti-a (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

Systems may be configured to monitor the operation of the various subsystems described above (e.g., storage processors, network infrastructures and/or data arrays) to ensure that they are all operating properly. And in the event that an error or malfunction is detected within one or more of these above-described subsystems, one or more error/advisory messages may be generated and provided to the user.

Unfortunately, these error/advisory messages are often sparse on details and may result in the user who received the error/advisory message needing to call a technical support number in order to have the error/advisory message interpreted and explained so that remedial action may be taken. Often times, the lack of details included within these error/advisory messages is due to the message library that is used to interpret these error/advisory messages being out-of-date (since these message libraries often require a system-level update in order for the message library to be updated).

Automated Message Library Updates:

Accordingly and as will be discussed below in greater detail, storage management process 10 may be configured to uncouple the updating of these message libraries from the updating of any system software associated with storage system 12, thus allowing these message libraries to be updated more easily (and more frequently).

Figure 3:
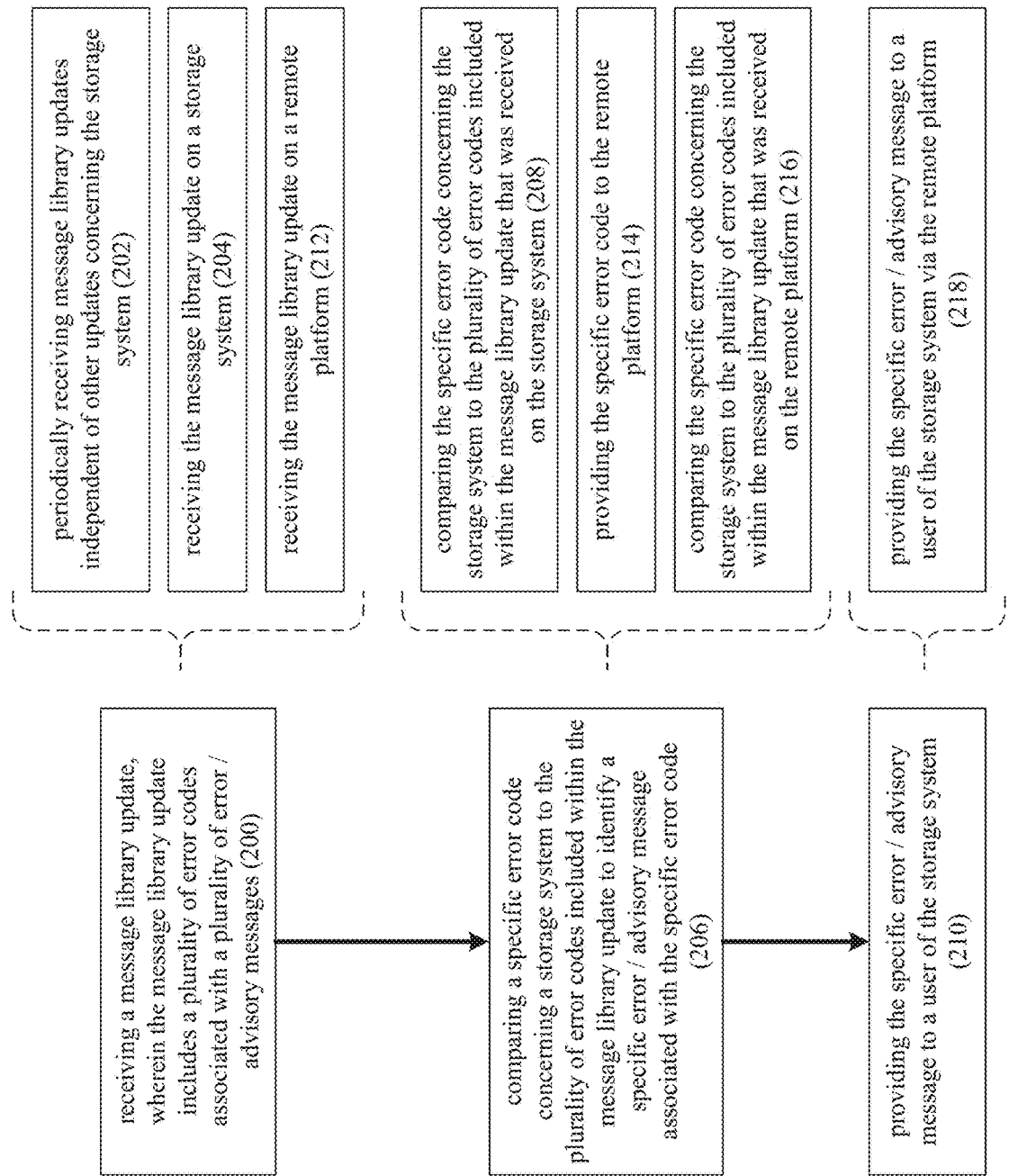
FIG. 3 is a flow chart of the storage management process of FIG. 1.
Figure 4:
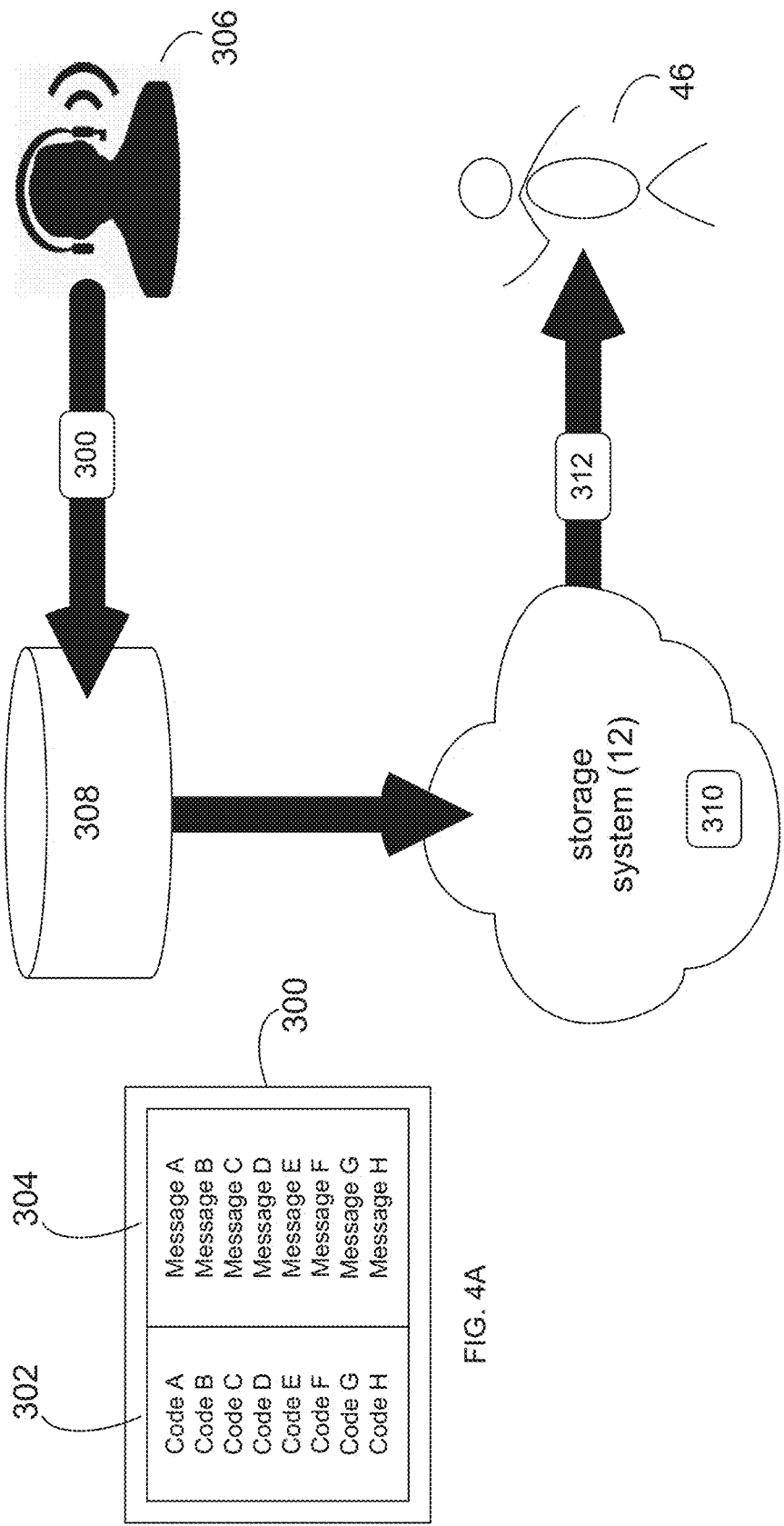
FIG. 4 is a diagrammatic view of one implementation of the storage management process of FIG. 1.

Referring also to FIGS. 3-4, storage management process 10 may be configured to receive 200 a message library update (e.g., message library update 300), wherein message library update 300 may include a plurality of error codes (e.g., error codes 302, FIG. 4A) that are associated with a plurality of error/advisory messages (e.g., error/advisory messages 304, FIG. 4A). Message library update 300 may be generated by support team 306. Examples of support team 306 may include but are not limited to: a single or group of support technicians, support engineers, programmers and/or software developers, wherein support team 306 may generate message library update 300 based upon issues identified with one or more of the above-described subsystems (e.g., storage processors, network infrastructures and/or data arrays) included within storage system 12.

Accordingly and when receiving 200 message library update 300, storage management process 10 may periodically receive 202 message library updates independent of other updates concerning storage system 12. Accordingly, suppose that a system-level software update for storage system 12 was only issued on an annual basis. Accordingly, if the frequency of the message library updates were tied to (i.e., the same as) the frequency of the system-level software updates, the plurality of error/advisory messages (e.g., error/advisory messages 304, FIG. 4A) associated with the plurality of error codes (e.g., error codes 302, FIG. 4A) may be out of date/stale. Accordingly and in order to avoid error/advisory messages 304 growing out of date/stale, storage management process 10 may periodically receive 202 message library updates (e.g., message library update 300) independent of (e.g., more frequently than) other updates concerning storage system 12.

In the particular configuration/implementation that is shown in FIG. 4, when receiving 200 message library update 300, storage management process 10 may receive 204 message library update 30 on storage system 12. For example, support team 306 may generate message library update 300 which may be provided to service advisory database 308, wherein service advisory database 308 may e.g., act as a repository for storing and making available the various message library updates (e.g., message library update 300). Accordingly and once message library update 300 is uploaded to service advisory database 308, message library update 300 may be obtained/available from service advisory database 308 and received 204 by storage system 12 (on which a local copy may be stored).

Accordingly and through the use of message library update 300 (which may be available from service advisory database 308 or stored on storage system 12), any specific error codes (e.g., specific error code 310) that are generated by storage system 12 may be identified and interpreted.

Specifically, storage management process 10 may compare 206 specific error code 310 concerning (and generated by) storage system 12 to plurality of error codes 302 included within message library update 300 to identify a specific error/advisory message (chosen from plurality of error/advisory messages 304) associated with specific error code 310. Specifically and in the configuration/implementation shown in FIG. 4 in which message library update 300 is locally stored on (or locally available to) storage system 12, when comparing 206 specific error code 310 concerning storage system 12 to plurality of error codes 302 included within message library update 300, storage management process 10 may compare 208 specific error code 310 concerning storage system 12 to plurality of error codes 302 included within message library update 300 that was received on (e.g., locally stored on or locally available to) storage system 12. Accordingly and if message library update 300 is not locally-stored on storage system 12 but is available from service advisory database 308, storage management process 10 may first need to access message library update 300 from service advisory database 308 (or obtain a copy of message library update 300 from service advisory database 308) prior to comparing 208 specific error code 310 concerning storage system 12 to plurality of error codes 302 included within message library update 300.

For example, suppose specific error code 310 is "Code A". Accordingly, storage management process 10 may compare 206 specific error code 310 (e.g., Code A) to plurality of error codes 302 included within message library update 300 (which is locally stored on or locally available to storage system 12) to identify the specific error/advisory message (e.g., Message A) associated with specific error code 310 (e.g., Code A). Specifically, if specific error code 310 concerns a malfunctioning driver for a network adapter included within storage processor 100, the specific error/advisory message associated with specific error code 310 may e.g., identify a patch that may be installed to address the issue, identify a driver update that may be downloaded to address the issue, identify a knowledgebase article that may be reviewed that addresses the issue, or identify a weblog that may be accessed to address the issue.

Figure 5:
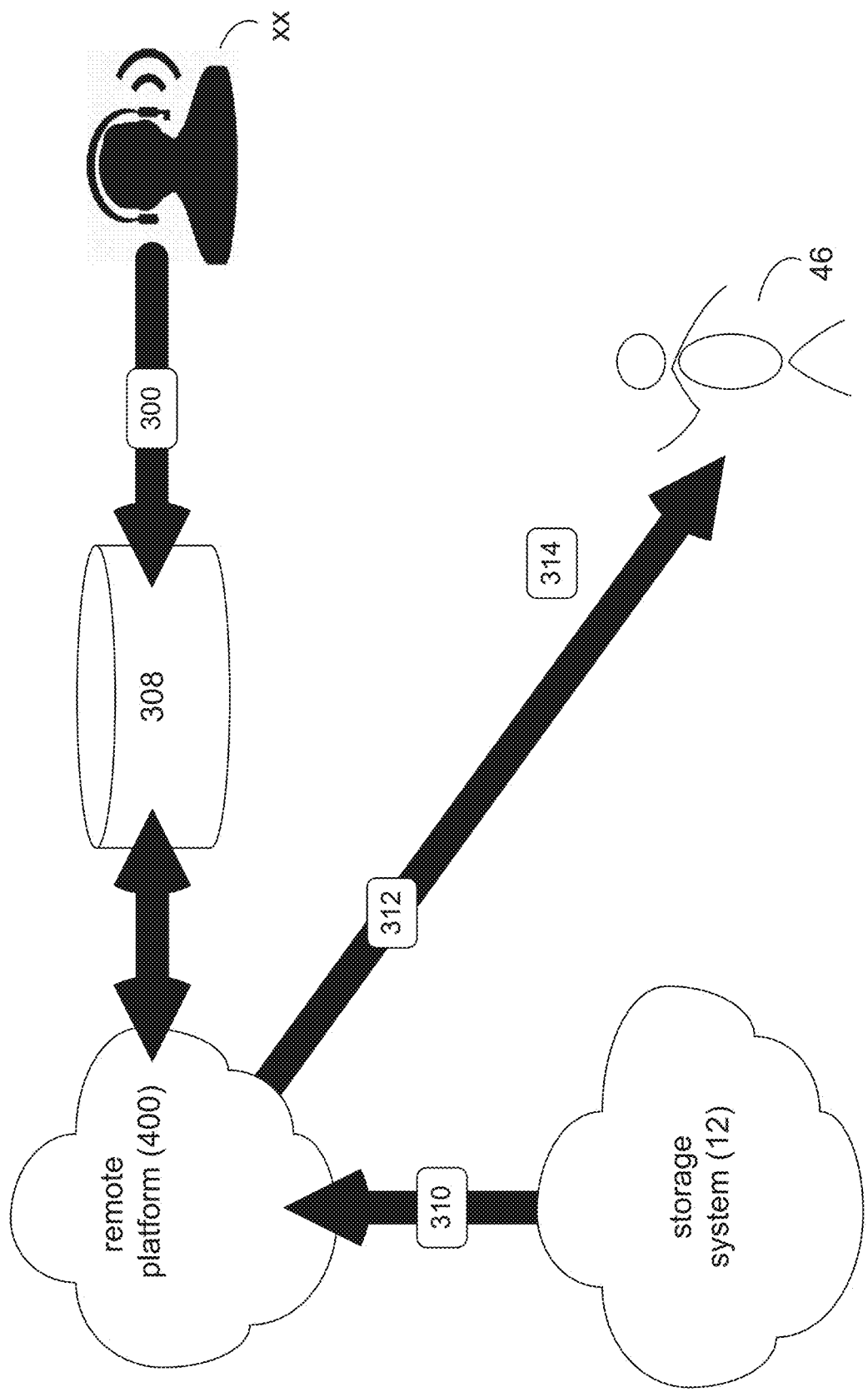
FIG. 5 is a diagrammatic view of another implementation of the storage management process of FIG. 1.

Storage management process 10 may then provide 210 the specific error/advisory message (e.g., specific error/advisory message 312) to a user of storage system 12. For example, assume that user 46 is an administrator of storage system 12. Accordingly, storage management process 10 may provide 210 specific error/advisory message 312 (e.g., Message A) associated with specific error code 310 (e.g., Code A) to user 46 (e.g., the administrator) of storage system 12. As discussed above, specific error/advisory message 312 may e.g., identify a patch that may be installed to address the issue; identify a driver update that may be downloaded to address the issue; identify a knowledgebase article that may be reviewed that addresses the issue; or identify a weblog that may be accessed to address the issue:

Cloud-Based Implementation:

While the system for automatically updating message library 300 is described above as being a localized implementation (e.g., message library update 300 is locally stored on or locally available to storage system 12), other configurations are possible and are considered to be within the scope of this disclosure. For example and referring also to FIG. 5, a remote platform (e.g., remote platform 400) may be utilized to remotely implement the above-described system for automatically updating message library 300.

For example, when receiving 200 message library update 300, storage management process 10 may receive 212 message library update 300 on remote platform 400, examples of which may include but are not limited to a remote computer, a remote series of computers, a remote server, a remote series of servers, or a cloud-based computing platform. Accordingly, once support team 306 generates message library update 300 and provides the same to service advisory database 308, message library update 300 may be obtained/available from service advisory database 308 and received 212 by remote platform 400 (on which a local copy may be stored).

When comparing 206 specific error code 310 concerning storage system 12 to plurality of error codes 302 included within message library update 300, storage management process 10 may provide 214 specific error code 310 to remote platform 400. Specifically and in the configuration/ implementation shown in FIG. 5, message library update 300 is maintained on remote platform 400 and/or service advisory database 308 (i.e., not stored locally on storage system 12). Accordingly, storage management process 10 may provide 214 specific error code 310 to remote platform 400 so that a comparison may be performed on remote platform 400.

Accordingly, when comparing 206 specific error code 310 concerning storage system 12 to plurality of error codes 302 included within message library update 300, storage management process 10 may compare 216 specific error code 310 concerning storage system 12 to plurality of error codes 302 included within message library update 300 that was received on (or available to) remote platform 400. Accordingly and if message library update 300 is not locally-stored on remote platform 400 but is available from service advisory database 308, storage management process 10 may first need to access message library update 300 from service advisory database 308 (or obtain a copy of message library update 300 from service advisory database 308) prior to comparing 216 specific error code 310 concerning storage system 12 to plurality of error codes 302 included within message library update 300.

Further and when providing 210 specific error/advisory message 312 to user 46 of storage system 12, storage management process 10 may provide 218 specific error/ advisory message 312 to user 46 of storage system 12 via remote platform 400. For example, user 46 may be required to log into remote platform 400 in order to receive, retrieve and/or review specific error/advisory message 312. Additionally, storage management process 10 may be configured to provide user 46 with notification 314 (e.g., a text message or an email) to inform user 46 of the presence of specific error/advisory message 312. Alternatively, storage management process 10 may be configured to provide user 46 with specific error/advisory message 312 via e.g., email or text message.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   providing a message library, wherein the message library includes one or more error/advisory messages known to be associated with one or more subsystems included within a storage system;
   generating, via a computing device associated with a support team user, a message library update, wherein the message library update includes a plurality of error codes associated with a plurality of error/advisory messages, wherein at least one error code concerns a malfunctioning driver for a network adapter included within a storage processor;
   receiving the message library update independently and more frequently than other updates concerning the storage system on a service advisory database;
   storing the message library update in the service advisory database;
   comparing a specific error code concerning a storage system to the plurality of error codes included within the message library update to identify a specific error/advisory message associated with the specific error code; and
   providing the specific error/advisory message to a user of the storage system via a text message, wherein providing the specific error/advisory message to a user of the storage system includes identifying a patch for installation that is configured to address the specific error code concerning the storage system, identifying a driver update for download that is configured to address the specific error code concerning the storage system, identifying an article that addresses the specific error code concerning the storage system, and identifying a weblog that addresses the specific error code concerning the storage system.

2. The computer-implemented method of claim 1 wherein receiving a message library update includes:
   periodically receiving message library update independent of other updates concerning the storage system.

3. The computer-implemented method of claim 1 further comprising:
   receiving the message library update on a storage system.

4. The computer-implemented method of claim 3 wherein comparing a specific error code concerning a storage system to the plurality of error codes included within the message library update includes:
   comparing the specific error code concerning the storage system to the plurality of error codes included within the message library update that was received on the storage system.

5. The computer-implemented method of claim 1 further comprising:
   receiving the message library update on a remote platform.

6. The computer-implemented method of claim 5 wherein comparing a specific error code concerning a storage system to the plurality of error codes included within the message library update includes:
   providing the specific error code to the remote platform; and
   comparing the specific error code concerning the storage system to the plurality of error codes included within the message library update that was received on the remote platform.

7. The computer-implemented method of claim 6 wherein providing the specific error/advisory message to the user of the storage system includes:
   providing the specific error/advisory message to the user of the storage system via the remote platform.

8. A computer program product residing on a non-transitory computer readable medium having a plurality of instructions stored thereon which, when executed by a processor, cause the processor to perform operations comprising:
   providing a message library, wherein the message library includes one or more error/advisory messages known to be associated with one or more subsystems included within a storage system;
   generating, via a computing device associated with a support team user, a message library update, wherein the message library update includes a plurality of error codes associated with a plurality of error/advisory messages, wherein at least one error code concerns a malfunctioning driver for a network adapter included within a storage processor;
receiving the message library update independently and more frequently than other updates concerning the storage system on a service advisory database;
storing the message library update in the service advisory database;
comparing a specific error code concerning a storage system to the plurality of error codes included within the message library update to identify a specific error/advisory message associated with the specific error code; and
providing the specific error/advisory message to a user of the storage system via a text message, wherein providing the specific error/advisory message to a user of the storage system includes identifying a patch for installation that is configured to address the specific error code concerning the storage system, identifying a driver update for download that is configured to address the specific error code concerning the storage system, identifying an article that addresses the specific error code concerning the storage system, and identifying a weblog that addresses the specific error code concerning the storage system.

9. The computer program product of claim 8 wherein receiving a message library update includes:
periodically receiving message library updates independent of other updates concerning the storage system.

10. The computer program product of claim 8 further comprising:
receiving the message library update on a storage system.

11. The computer program product of claim 10 wherein comparing a specific error code concerning a storage system to the plurality of error codes included within the message library update includes:
comparing the specific error code concerning the storage system to the plurality of error codes included within the message library update that was received on the storage system.

12. The computer program product of claim 8 further comprising:
receiving the message library update on a remote platform.

13. The computer program product of claim 12 wherein comparing a specific error code concerning a storage system to the plurality of error codes included within the message library update includes:
providing the specific error code to the remote platform; and
comparing the specific error code concerning the storage system to the plurality of error codes included within the message library update that was received on the remote platform.

14. The computer program product of claim 13 wherein providing the specific error/advisory message to the user of the storage system includes:
providing the specific error/advisory message to the user of the storage system via the remote platform.

15. A computing system including a processor and memory configured to perform operations comprising:
providing a message library, wherein the message library includes one or more error/advisory messages known to be associated with one or more subsystems included within a storage system;
generating, via a computing device associated with a support team user, a message library update, wherein the message library update includes a plurality of error codes associated with a plurality of error/advisory messages, wherein at least one error code concerns a malfunctioning driver for a network adapter included within a storage processor;
receiving the message library update independently and more frequently than other updates concerning the storage system on a service advisory database;
storing the message library update in the service advisory database;
comparing a specific error code concerning a storage system to the plurality of error codes included within the message library update to identify a specific error/advisory message associated with the specific error code; and
providing the specific error/advisory message to a user of the storage system via a text message, wherein providing the specific error/advisory message to a user of the storage system includes identifying a patch for installation that is configured to address the specific error code concerning the storage system, identifying a driver update for download that is configured to address the specific error code concerning the storage system, identifying an article that addresses the specific error code concerning the storage system, and identifying a weblog that addresses the specific error code concerning the storage system.

16. The computing system of claim 15 wherein receiving a message library update includes:
periodically receiving message library updates independent of other updates concerning the storage system.

17. The computing system of claim 15 further comprising:
receiving the message library update on a storage system.

18. The computing system of claim 17 wherein comparing a specific error code concerning a storage system to the plurality of error codes included within the message library update includes:
comparing the specific error code concerning the storage system to the plurality of error codes included within the message library update that was received on the storage system.

19. The computing system of claim 15 further comprising:
receiving the message library update on a remote platform.

20. The computing system of claim 19 wherein comparing a specific error code concerning a storage system to the plurality of error codes included within the message library update includes:
providing the specific error code to the remote platform; and
comparing the specific error code concerning the storage system to the plurality of error codes included within the message library update that was received on the remote platform.

21. The computing system of claim 20 wherein providing the specific error/advisory message to the user of the storage system includes:
providing the specific error/advisory message to the user of the storage system via the remote platform.

22. The computing system of claim 15, further comprising a fronted cache memory system.

23. The computing system of claim 22, wherein the fronted cache memory system includes one or more of a dynamic random access memory (RAM) cache memory system and a flash-based, cache memory system.

24. The computing system of claim 15, further comprising a backend cache memory system.

25. The computing system of claim 15, further comprising a redundant array of independent disks (RAID) device, wherein the RAID device includes a RAID controller card and a plurality of storage hard disk drives.

26. The computing system of claim 15, further comprising a storage system, wherein the storage system includes one or more of a Network Attached Storage (NAS) system and a Storage Area Network (SAN).

\* \* \* \* \*